Feb. 14, 1956   B. P. BROWN, JR   2,735,092
WAVE GUIDE COUPLING SYSTEM AND METHOD
Filed Aug. 2, 1948
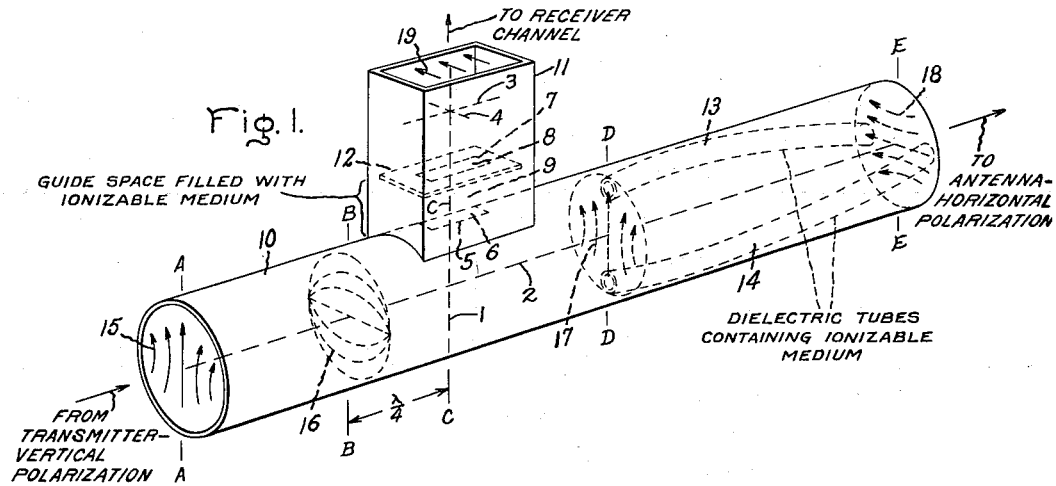
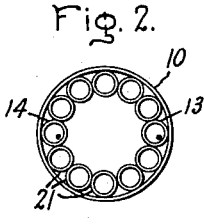
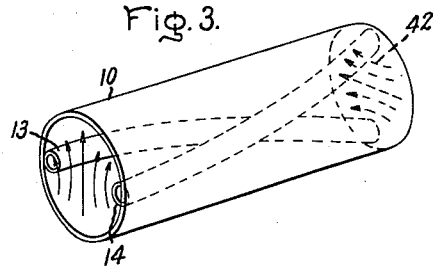
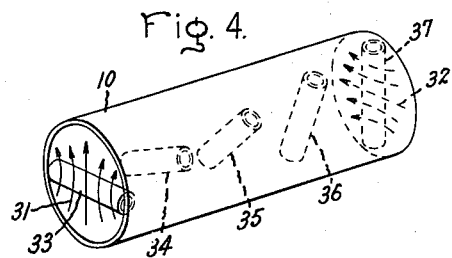
Inventor:
Burton P. Brown, Jr.,
by Merton D. Moore
His Attorney.

000
United States Patent Office 2,735,092
Patented Feb. 14, 1956

2,735,092

WAVE GUIDE COUPLING SYSTEM AND METHOD

Burton P. Brown, Jr., Baldwinsville, N. Y., assignor to General Electric Company, a corporation of New York Application August 2, 1948, Serial No. 42,075

30 Claims. (Cl. 343—5)

This invention relates generally to the transmission and reception of ultra high frequency electromagnetic energy, and more particularly to a method and apparatus for guiding such energy into different channels, in response to its energy level and to devices for carrying out this method. Such devices are frequently employed for connecting together one or more transmitters and receivers to a common antenna system. When so employed in conjunction with radar pulse transmitting and receiving systems, they are commonly known as transmit-receive switches, or T-R devices.

This invention provides a method and apparatus for operating a transmitter and a receiver in conjunction with a common antenna in a pulse-echo system in which the plane of polarization of an electromagnetic wave, passing through a wave guide filter at a high intensity level, is rotated. Such a wave may, for example, be a high intensity pulse wave from a microwave radar transmitter. Briefly, the rotation is caused by discontinuities or asymmetries in the wave guide structure offered when an ionizable medium, contained in certain sections of the filter, is ionized by electromagnetic energy at the high intensity level. When a low intensity wave, for example a reflected pulse-echo wave, is returned through the filter, no ionization occurs and hence no substantial asymmetry is introduced in the wave guide structure, and the electromagnetic energy does not suffer any rotation in its plane of polarization. The invention also comprises associated apparatus for making use of the difference in polarization to direct the energy into different channels according to its intensity level and direction of travel.

It is an object of the present invention to provide a novel method for operating a transmitter into, and a receiver from, a common antenna system.

Another object of the present invention is the provision of a filter network for automatically varying the plane of polarization of applied electromagnetic wave energy in accordance with the intensity level of said energy.

A further object of the present invention is the provision of a transmit-receive device particularly adapted, in connection with pulse transmitting and receiving systems, for guiding a pulse of electromagnetic energy from a transmitter to an antenna in a first plane of polarization during transmission and for guiding electromagnetic energy from the same antenna to a receiver in a different plane of polarization during reception.

Still a further object is the provision of an improved transmit-receive device which can effectively handle a larger amount of power from a transmitter than heretofore possible.

Still a further object is the provision of an improved transmit-receive switch which will protect a microwave pulse receiver from high intensity transmitter pulses in spite of failure on the part of the elements responsive to the intensity level.

Still a further object is the provision of a novel wave guide structure for automatically rotating the plane of polarization of electromagnetic energy in accordance with the intensity level of such energy.

For additional objects and advantages and for a better understanding of the invention, attention is now directed to the following description and accompanying drawings, and also to the appended claims in which the features of the invention believed to be novel are particularly pointed out. In the drawing:

Fig. 1 is a simplified perspective view of a transmit-receive switch and wave guide assembly embodying the invention; in which the electric field distributions at certain plane sections through the assembly are indicated by dashed arrows; Fig. 2 is a vertical elevation view of the right end of the wave guide assembly, in the plane E—E of Fig. 1, in which certain additional elements have been incorporated; Fig. 3 is a perspective view of part of the circular wave guide shown in Fig. 1 to the right of plane D—D, embodying an alternative construction; and Fig. 4 is also a perspective view of part of the circular guide shown in Fig. 1 to the right of plane D—D, embodying another alternative construction.

Referring to Fig. 1, there is shown a circular wave guide 10 which is designed to support the $TE_{11}$ mode of propagation at the normal frequency of operation. As is well known to those skilled in the art, the $TE_{11}$ mode of propagation consists of a field configuration in which all components of the electric field lie in a plane transverse to the direction of propagation and in which there is only one full period variation of the radial component of the electric field along the angular (i. e., circumferential) direction and only one half-period variation of the angular component of the electric field along the radial direction. For a further explanation of this type of wave guide propagation and other types mentioned herein, reference may be made to various texts on the subject. For example, see chapter 10 of "Principles of Radar" by the Massachusetts Institute of Technology Radar School Staff, second edition (McGraw-Hill, 1946).

In Fig. 1, the pairs of capital letters A—A, B—B, C—C, D—D, and E—E refer to transverse plane sections through a circular wave guide 10 at the positions indicated by the adjacent section lines. Intersecting the wave guide 10 is a rectangular wave guide 11 mounted with its longitudinal axis 1 perpendicular to the longitudinal axis 2 of the circular wave guide and lying in plane C—C. Wave guide 11 is also oriented with its major transverse axis 3 parallel to, and its minor transverse axis 4 perpendicular to, the longitudinal axis 2 of circular wave guide 10. The rectangular wave guide is designed to support the $TE_{01}$ mode of propagation at the normal frequency of operation. Briefly, the $TE_{01}$ mode of propagation consists of a field configuration in which all the components of the electric field lie in a plane transverse to the direction of propagation, and in which there is no variation in the density of the electric field encountered in going across the narrower dimension, or minor transverse axis, of the guide, and further in which there is one half-period variation in the density of the electric field encountered in going across the wider dimension, or major transverse axis, of the guide.

At section B—B, which is situated at or near a quarter wavelength at the operating frequency of the system from section C—C through the center of rectangular guide 11, there is shown a wire screen 16, mounted transversely in the circular guide. The screen 16 consists of a plurality of fine conducting wires so curved that they are substantially perpendicular to electric field lines for a vertically-polarized $TE_{11}$ mode of propagation. Between sections D—D and E—E there are shown two hollow tubes 13 and 14 which are placed, respectively, at the top and at the bottom of the circular guide 10 and which are arranged to lie along its inner surface in a helical surface rotating through a total angle of 90 degrees between the two sections. These tubes are each formed of a hollow dielectric material such as glass or quartz and contain an ionizable medium such as argon, krypton, neon, or xenon, for example.

In operation, the system is energized from an ultra-high frequency transmitter (not shown) which supplies, at section A—A, a train of vertically polarized waves of the $TE_{11}$ mode, of which the electric vector is represented by the curved arrows 15. These waves travel along the circular guide to the right and pass through the wire screen 16 substantially unaffected, because their electric vector is perpendicular to the conducting wires. Assuming perfect guides, the rectangular guide 11 cannot receive any excitation from the transmitted waves since its orientation is such that the vertically polarized transmitted waves cannot propagate into it. The transmitted waves then arrive at section D—D still vertically polarized, as represented by the arrows 17. If the power carried in the transmitted waves is high, as is the case in pulsed radar systems, the potential gradient of the electric vector will be sufficient to ionize the media contained in tubes 13 and 14. Ionization will be present in these tubes throughout the time during which the transmitted wave passes through the wave guide from section D—D to section E—E, and the net result of the ionization will be, in effect, to produce two conducting tubes which spiral uniformly through a space angle of 90 degrees. When conducting media are so placed in circular wave guides the points of maximum electric fields will be guided by the conducting tubes. That is, the conducting media, or ionized tubes, cause the polarization of the incident waves to be rotated. In this case, since the tubes rotate through 90 space degrees, the electric vector of the transmitted waves correspondingly rotates along with the tubes, and hence arrives at section E—E oriented in the horizontal direction, as represented by the arrows 18. From section E—E, the emerging horizontally-polarized waves may be impressed upon a suitable antenna system and radiated.

Assuming that radiation has occurred and ceased, and that an echo consisting of a train of electromagnetic waves arrives at the antenna system after the transmitter has ceased to transmit, these waves will enter the circular guide at section E—E and travel towards the left. Since the amount of energy contained in the reflected waves is normally very small in comparison with that contained in the transmitted waves, the medium in tubes 13 and 14 will not be ionized by the reflected waves. The tubes preferably have thin walls made of a material having a low dielectric constant and loss factor, so that when the medium contained in them is nonconducting they will not offer any appreciable discontinuity in the guide. Accordingly, the reflected waves will reach section D—D substantially unhindered and without change in polarization. Since the polarization has remained horizontal, the reflected waves are now free to propagate into the rectangular guide 11 and they will be prevented from flowing to the left into the transmitter by the wire screen 16 whose conductive wires lie in a plane parallel to their electric vectors. The wire screen, therefore, behaves as a short circuit towards the horizontally-polarized waves. Further, since screen 16 is situated approximately one-quarter wave-length, at the operating frequency, from section C—C and axis 1 of rectangular guide 11, the impedance of guide 10, looking to the left from section C—C, will appear to be a very high impedance, preventing any flow of energy into the circular guide towards the left of section C—C and hence forcing it to propagate into guide 11.

In order to provide impedance matching, and also to compensate to a certain extent for unsymmetry in the system, a rectangular window 5 is cut into the circular guide and the rectangular guide is symmetrically mounted in a manner to enclose the slot thus formed. It has been found in practice that the dimensions of this window are not critical. In theory, when symmetry is perfectly maintained in the system and when the vertical axis of polarization of the transmitted waves passes exactly through the center of window 5, there will be no radiation of the $TE_{01}$ mode whatsoever into the rectangular guide. In practice, however, these conditions are rarely, if ever, attained and there will be some radiation of the transmitted waves into the rectangular guide, although only with great attenuation.

Since this transmit-receive filter may be used with very high power radar transmitters and very sensitive receivers, and also, since the machine tolerances attainable in practice may allow a small amount of energy to enter guide 11 under the transmit condition, it is desirable that some additional protective means be provided to further attenuate the energy propagated from the transmitted wave into rectangular guide 11 and thence to the receiver. This may be accomplished in known manner by inserting in the rectangular guide 11 any suitable low power transmit-receive device known to the art which will fire when the transmitter is radiating energy into the filter. As shown in Fig. 1, an effective procedure is to fill the space 9 of the rectangular guide with an ionizable medium. The space 9 is bounded at its lower extremity by a dielectric plate 6 which seals the window 5 and makes it gas-tight, and at its upper extremity by a similar dielectric plate 8 which seals a similar window 7 in a rectangular plate 12 inserted in the guide. The ionizable medium introduced into the space 9 is selected so that the comparatively small amount of energy entering the rectangular guide, when the transmitter sends energy into the system, will be sufficient to ionize it.

This system has the advantage that the additional transmit-receive valve, being the ionizable medium in space 9, is only a secondary attenuator. The transmitted waves passing through the guide by the window 6 are vertically polarized so that they cannot effectively propagate into the rectangular guide. Accordingly, any energy that enters the rectangular guide is due to unsymmetry and imperfections in the system and is only a small fraction of the total energy passing through the circular guide. Hence, the secondary attenuator need only be a low power device, and even if it fails to operate, the energy which passes up the rectangular guide to the receiver, while it may render the receiver temporarily inoperative, will not be sufficient to damage it extensively.

My improved transmit-receive filter has also the considerable advantage that the transmitted energy cannot damage the receiver even though the ionizable medium contained in tubes 13 and 14 should fail to ionize. This is due to the arrangement whereby the waves entering the circular guide from the transmitter can effectively pass wire screen 16 only if they are vertically polarized. Accordingly, they must necessarily be vertically polarized when they pass the window 5 into the rectangular guide and hence cannot propagate into it to any extent. Thereafter, if the medium contained in tubes 13 and 14 fails to ionize, the transmitted waves will nevertheless pass out to the antenna but will remain vertically polarized. Only the horizontally polarized component of the electromagnetic energy contained in an echo or received pulse can propagate into the rectangular guide and energize the receiver. Accordingly, failure of the ionizable medium in tubes 13 and 14 to ionize would likely mean that no echoes would be received, but nevertheless the receiver would not be damaged in any way.

Referring to Fig. 2, there is shown, in vertical cross-section, a view at section E—E of the circular guide, in which certain modifications have been incorporated. In addition to the two tubes 13 and 14 containing the ionizable medium, a number of empty tubes 21 have been inserted in the assembly and spiral in the same fashion through 90 degrees from section D—D to section E—E. The purpose of the empty tubes 21 is simply to make the interior boundary of the guide more uniform when the ionizable medium is not ionized. This counterbalances any discontinuity offered by the dielectric material of which tubes 13 and 14 are constructed and reduces any slight rotation in polarization which might otherwise be caused to low intensity waves.

Fig. 3 is a perspective view of a modified form of part of the circular wave guide shown in Fig. 1, between sections D—D and E—E. In this modification, the two tubes 13 and 14 are shown initially rotated through 90 space degrees around the axis of the guide from their disposition in Fig. 1. Thereafter, they spiral in similar fashion through 90 space degrees, from section D—D to section E—E, along the inner surface of the guide. With this arrangement it has been found from tests that the vertically polarized waves are rotated through 90 degrees in much the same way as they are with the arrangement shown in Fig. 1.

Referring to Fig. 4, there is shown a perspective view of another modification of that part of the circular guide shown in Fig. 1 between sections D—D and E—E. In this form of the invention, a number of short, cylindrical tubes are substituted for the spiraling tubes 13 and 14. These tubes each have an active length of ionizable medium approximately equal to the diameter of the circular wave guide. The first tube 33 at section D—D is oriented in a horizontal plane with its longitudinal axis perpendicular to the longitudinal axis of the circular guide and the electric polarization of the incident energy 31. The succeeding tubes 34, 35, 36, and 37 are subsequently equally spaced between sections D—D and E—E with their longitudinal axes perpendicular to that of the guide, and they are progressively rotated through substantially equal angular intervals, from a horizontal plane at section D—D to a vertical plane at section E—E. Each tube is sealed and contains an ionizable gas, as in the case of tubes 13 and 14.

When a wave of electromagnetic energy at a high level passes through the guide the ionizable medium contained in these tubes is ionized and the tubes, accordingly, become equivalent to conductive rods. Since, for transmission to occur, the electric vector of the waves can only intercept a conductor substantially at right angles, the plane of polarization of the electromagnetic waves will tend to rotate so as to maintain this relation. Accordingly, the plane of polarization leaves the guide at section E—E horizontally polarized. It has been found in practice that this arrangement is more effective than the spiraling tubes shown in Fig. 1 and provides the same rotation of polarization with a lesser attenuation in the guide and with a more economical construction. In a practical construction, the length of the sealed tubes may be greater than the diameter of the guide, and they may have their ends supported in two series of equally-spaced holes lying on diametrically-opposite helical curves on the surface of the circular guide.

In practice, it has been found that the number of ionizable tubes employed is not particularly critical so long as the number exceeds a certain minimum of say 4; although for broad band operation, the number of tubes employed should be sufficient to simulate an ionizable slab having a helical surface in which case 10 to 20 tubes have been used successfully in tests.

While a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. A wave guide coupling system comprising a substantially circular wave guide having input and output openings, a secondary rectangular wave guide transversely intersecting said circular guide in a particular plane and communicating with a feed aperture in the wall thereof, said secondary guide having its major transverse axis parallel to the axis of said circular guide and constructed so that propagation into it of a high-frequency electromagnetic wave passing through said circular guide is permitted when said wave is polarized in a plane transverse to said particular plane and substantially prevented when said wave is polarized in said particular plane, means for polarizing in said particular plane the wave propagated from said input opening, and means interposed between said aperture and said output opening for rotating the plane of polarization of electromagnetic energy at a high intensity level through substantially an odd number of right angles while not affecting the polarization of electromagnetic energy at a low intensity level, said last means comprising a dielectric medium which becomes ionized in response to a sufficiently high intensity level of the electromagnetic energy impressed upon it.

2. A transmit-receive switch comprising a substantially circular wave guide having input and output openings, a secondary rectangular wave guide transversely intersecting said circular guide in a particular plane and communicating with a feed aperture in the wall thereof, said secondary guide having its major transverse axis parallel to the axis of said circular guide and constructed so that propagation into it of a high-frequency electromagnetic wave passing through said circular guide is permitted when said wave is polarized in a plane transverse to said particular plane and substantially prevented when said wave is polarized in said particular plane, means for polarizing in said particular plane the wave propagated from said input opening, and a plurality of hollow dielectric tubes mounted along the inner surface of said circular wave guide between said aperture and said output opening in a helical surface, said tubes rotating through an odd multiple of ninety angular degrees along the longitudinal axis of said circular guide and each containing an ionizable medium that becomes conducting when electromagnetic energy at a sufficiently high intensity level passes through said circular guide.

3. A transmit-receive switch comprising a substantially circular wave guide having input and output openings, a secondary rectangular wave guide transversely intersecting said circular guide in a particular plane and communicating with a feed aperture in the wall thereof, said secondary guide having its major transverse axis parallel to the axis of said circular guide and constructed so that propagation into it of a high-frequency electromagnetic wave passing through said circular guide is permitted when said wave is polarized in a plane transverse to said particular plane and substantially prevented when said wave is polarized in said particular plane, means for polarizing in said particular plane the wave propagated from said input opening, and a number of straight hollow dielectric tubes mounted transversely in said circular wave guide and spaced apart at intervals between said aperture and said output opening, the first of said tubes closest to said feed aperture being mounted transversely of said particular plane and the last of said tubes closest to said output opening being mounted in said particular plane, intermediate tubes being arranged to lie in a helical surface rotating through an odd multiple of a right angle between said first and said last tubes, said hollow tubes each containing an ionizable medium that becomes conducting when electromagnetic energy at a sufficiently high intensity level passes through said circular guide.

4. A transmit-receive switch comprising a horizontal circular wave guide having input and output openings and of dimensions such as to support principally the TE$_{11}$ mode of propagation at the operating frequency, a vertical rectangular wave guide mounted about a rectangular window situated in said circular wave guide between said openings, its longitudinal axis, its major transverse axis and its minor transverse axis being respectively perpendicular, parallel and perpendicular to the longitudinal axis of said circular wave guide, the dimensions of said rectangular guide being such as to support principally the TE$_{01}$ mode of propagation at said frequency, a polarizing screen mounted in said circular guide between said input opening and said window at a distance from said window of approximately one-quarter wavelength at said operating frequency, said screen being oriented to pass only a vertically polarized wave, and a plurality of hollow rod-like dielectric tubes mounted transversely in said circular wave guide at substantially equal axial intervals between said window and said output opening, a first of said tubes nearest said window being mounted horizontally and the last of said tubes nearest said output opening being mounted vertically, intermediate tubes being arranged to lie in a helical surface rotating through substantially one right angle between said first and said last tubes, said hollow tubes each containing an ionizable medium that becomes conducting when electromagnetic energy at a sufficiently high intensity level passes through said circular guide.

5. The method of operating a transmitter of pulsed electromagnetic waves, polarized in one plane, and a pulse-echo receiver, responsive to echoes of said transmitted waves returned from a reflecting object polarized in a transverse plane, through a common signal channel without interaction, which comprises the steps, in the order named, of transmitting said pulsed waves through said common signal channel, rotating the plane of polarization of said pulsed waves through substantially 90°, radiating said rotated pulsed waves toward a remote reflecting object and receiving echo waves of said radiated waves returned from said reflecting object, translating said received echo waves through said channel in the opposite direction without change in polarization, and supplying said translated waves to said receiver.

6. A wave guide coupling system comprising a circular wave guide adapted to convey plane-polarized electromagnetic waves of a high frequency supplied to its input, and means controlled by said waves for changing their plane of polarization as they pass through said guide providing their electrical intensity exceeds a predetermined minimum level, said means comprising a medium contained within said guide ionizable in response to waves of said minimum intensity level and formed to define polarization-changing means for said waves.

7. A wave guide coupling system comprising a circular wave guide adapted to convey plane-polarized electromagnetic waves of a high frequency supplied to its input, and means controlled by said waves for changing their plane of polarization as they pass through said guide providing their electrical intensity exceeds a predetermined minimum level, said means comprising a region extending along said waveguide having the form of a thin slab having a twist along the length of the guide, said region being defined by gas contained within said waveguide and said gas being ionizable in response to waves above said minimum intensity level, whereby waves exceeding said intensity are transmitted with rotated polarization and waves of less intensity are transmitted without rotation of polarization.

8. A wave guide coupling system comprising an elongated circular wave guide constructed to transmit a high-frequency electromagnetic wave which is supplied to one end and plane-polarized in a particular plane through the longitudinal guide axis, and means within said guide for rotating the plane of polarization of said wave through a predetermined angle provided that it has at least a predetermined electrical intensity, said means comprising an ionizable medium together with means for confining said medium within at least a portion of a region bounded by the surfaces of a flat, helically-warped slab extending along the axis of said guide.

9. A wave guide coupling system comprising an elongated circular wave guide constructed to transmit an electromagnetic wave of a predetermined high frequency in the TE$_{11}$ mode, means for impressing said wave on one end of said guide with polarization in a particular plane through the guide axis, and means for rotating said plane of polarization as said wave is propagated through said guide providing that its electrical intensity exceeds a predetermined minimum level, said means comprising an ionizable medium within said guide together with dielectric means for confining said medium within a region defined by a flat, helically-warped slab extending along the guide axis.

10. A wave guide coupling system comprising an elongated circular wave guide constructed to transmit a high-frequency electromagnetic wave which is supplied to one end and plane-polarized in a particular plane through the longitudinal guide axis, and means within said guide for rotating the plane of polarization of said wave through a predetermined angle when it has at least a predetermined electrical intensity, said means comprising a pair of hollow dielectric tubes lying along the inner surface of said guide and spiralling along its axis, said tubes being diametrically opposite at any transverse plane through said axis, each tube containing a gas that becomes ionized when the intensity of the incident wave exceeds said minimum level.

11. A wave guide coupling system comprising an elongated circular wave guide constructed to transmit a high-frequency electromagnetic wave which is supplied to one end and plane-polarized in a particular plane through the longitudinal guide axis, and means within said guide for rotating the plane of polarization of said wave through a predetermined angle when it has at least a predetermined electrical intensity, said means comprising a plurality of transverse hollow dielectric tubes extending diametrically across said guide and axially spaced apart along said guide axis, said tubes all lying in the plane of a helical warped surface coaxial with said guide, the first tube in the path of said wave being perpendicular to said particular plane and the last tube being at said predetermined angle with respect to said first tube, each tube containing a gas that becomes ionized when the intensity of the incident wave exceeds said minimum level.

12. A wave guide coupling system comprising an elongated circular wave guide constructed to propagate a high-frequency electromagnetic wave which is supplied to one end and plane-polarized in a particular plane through the longitudinal guide axis, means within a section of said guide axially spaced from said end for rotating the plane of polarization of said wave through an odd multiple of ninety degrees when said wave has at least a predetermined minimum electrical intensity, said means comprising an ionizable medium together with means for confining said medium within at least a portion of a region bounded by the surfaces of a flat, helically-warped slab extending along the axis of said section, and a transverse rectangular wave guide communicating with an aperture in the side of an intermediate section of said circular guide, said rectangular guide being constructed to transmit a wave of said frequency and oriented with its longitudinal axis in said particular plane and its major transverse axis parallel to the longitudinal axis of said circular guide, whereby wave energy is propagated into said rectangular guide only when polarized in a second longitudinal plane at ninety degrees to said particular plane.

13. A wave guide coupling system comprising an elongated circular wave guide constructed to transmit an electromagnetic wave of a predetermined high frequency in the TE$_{11}$ mode, means for impressing said wave on one end of said guide with polarization in a particular plane through the guide axis, means for rotating said plane of polarization by an odd multiple of ninety degrees as said wave is propagated through said guide providing that its electrical intensity exceeds a predetermined minimum level, said means comprising an ionizable medium enclosed within a section of said guide spaced axially from said one end, said section including dielectric means for confining said medium within at least a portion of a region bounded by the surfaces of a flat, helically-warped slab extending along said guide axis and having a total twist equal to an odd multiple of ninety degrees, and a transverse rectangular wave guide communicating with an aperture in the side of an intermediate section of said circular guide, said rectangular guide being constructed to transmit a wave of said frequency in the $TE_{01}$ mode and oriented with its longitudinal axis in said particular plane and its major transverse axis parallel to the longitudinal axis of said circular guide, whereby wave energy is propagated into said rectangular guide only when polarized in a second longitudinal plane at ninety degrees to said particular plane.

14. In a pulse radar system, a common signal channel capable of conveying plane-polarized high-frequency pulses in either of two mutually-perpendicular planes of polarization, pulse transmitting means for impressing high-intensity pulses on the input to said channel with polarization in a first of said planes, means in said channel for rotating the polarization of said pulses to the second of said planes at the channel output, antenna means for radiating said output pulses and for receiving low-intensity echoes thereof from remote objects, means for supplying said echoes through said common channel in the reverse direction without change in polarization, means for extracting energy from said channel at a point near its input only when polarized in said second plane, and pulse receiving means coupled to said energy-extracting means.

15. In a pulse radar system, a circular wave guide capable of conveying plane-polarized high-frequency pulses in either of two mutually-perpendicular planes of polarization, pulse transmitting means for impressing high-intensity pulses on the input to said guide with polarization in a first of said planes, means in said guide for rotating the polarization of said pulses to the second of said planes at the guide output, antenna means for radiating said output pulses and for receiving low-intensity echoes thereof from remote objects, means for supplying said echoes through said guide in the reverse direction, said rotating means being inoperative to change the plane of polarization of waves of said low intensity, means for extracting energy from said guide only when polarized in said second plane, said extracting means comprising a rectangular wave guide coupled to an aperture located in said circular guide at a point adjacent its input end, and pulse receiving means coupled to said rectangular guide.

16. In a pulse radar system, a circular wave guide capable of conveying plane-polarized high-frequency pulses in either of two mutually-perpendicular planes of polarization, pulse transmitting means for impressing high-intensity pulses on the input to said guide with polarization in a first of said planes, means in said guide for rotating the polarization of said pulses to the second of said planes at the guide output, antenna means for radiating said output pulses and for receiving low-intensity echoes thereof from remote objects, means for supplying said echoes through said guide in the reverse direction, said rotating means comprising an ionizable dielectric medium capable of being ionized by said high-intensity pulses but incapable of being ionized by said low-intensity echoes, means for extracting energy from said guide only when polarized in said second plane, said extracting means comprising a rectangular wave guide coupled to an aperture located in said circular guide at a point adjacent its input end, and pulse receiving means coupled to said rectangular guide.

17. The method of processing plane polarized electromagnetic waves of relatively high and low intensity, comprising propagating waves of one of said intensities at a time along a substantially symmetrical wave guide, introducing a discontinuity in said guide in response to waves of said high intensity to rotate their plane of polarization and effectively removing said discontinuity from said guide for waves of said low intensity to prevent a rotation of their plane of polarization.

18. Apparatus for processing electromagnetic waves of different intensity comprising a wave guide, an ionizable medium within said wave guide, said medium being responsive to polarized waves having greater than a given intensity propagated along said guide to become ionized and having a form to define polarization-rotating means for the applied waves, and said medium being non-responsive to applied waves having less than said given intensity whereby said waves of less intensity are propagated along said guide without substantial change in polarization.

19. Apparatus for processing plane polarized electromagnetic waves of different intensity comprising a first wave guide, an ionizable medium located within said guide, said first guide sustaining propagation of waves of a first polarization, a second wave guide joined to said first guide at a wave coupling junction intermediate one end of said first guide and the location of said ionizable medium in said first guide, said second guide sustaining propagation of waves of a second polarization while substantially blocking propagation of waves of said first polarization, said medium being ionized in response to waves above a given intensity propagated with said first polarization past said junction from said one end and having a form to define polarization-rotating means for said waves of said first polarization to provide waves of said second polarization, said medium being non-responsive to waves having less than said given intensity propagated with said second polarization toward said junction from the other end of said one guide to permit propagation of said second waves without a rotation of polarization into said second guide.

20. In combination, a wave guide adapted to transmit waves of high intensity in one direction and waves of low intensity in the opposite direction, means located at a point in said guide to rotate the plane of polarization of said waves of high intensity and to transmit said waves of low intensity without change of polarization.

21. In combination, a wave guide adapted alternately to transmit waves of high intensity in one direction and waves of low intensity in the opposite direction, and means responsive to the intensity of said high intensity waves in said guide to rotate the plane of polarization of said waves of high intensity, said means being non-responsive to the intensity of said low intensity waves and thereby ineffective to change the plane of polarization of said waves of low intensity.

22. The combination in a pulse echo system of a first wave guide, a second guide coupled thereto to receive waves therefrom having only a predetermined polarization, means to transmit high intensity waves having a different plane of polarization through said first guide in a given direction, means in said first guide to shift the plane of polarization of said high intensity waves to said predetermined polarization after said waves have passed said second guide, said first guide being adapted to transmit reflections of said shifted waves in the opposite direction therethrough to said second guide, said polarization-shifting means being insensitive to said reflections, whereby their plane of polarization is maintained substantially unchanged.

23. A polarization converter for electromagnetic waves propagated along a substantially symmetrical wave guide comprising an element mounted within said guide to vary the polarization of said waves, said element having a form variable in the direction of propagation of said waves along said guide and having an electrical conductivity dependent upon the intensity of said waves for introducing an asymmetry in said guide along the direction of propagation of said waves thereby to vary the polarization of said waves, said electrical conductivity of said element being variable nonlinearly with respect to the intensity of said waves.

24. A polarization converter for electromagnetic waves propagated along a waveguide comprising an element mounted within said guide having an electrical conductivity variable in response to the intensity of said waves and defining polarization-changing means for said waves according as the conductivity thereof attains a predetermined value.

25. The method of generating waves of a certain polarization for propagation in a waveguide which comprises propagating waves of another polarization within said guide, receiving said propagated waves as lines of force on a normally nonconductive system mounted within said guide, rendering said normally nonconductive system conductive in response to the intensity of said received waves, guiding said lines of force on such conductive system so as to change them to the desired polarization, and detaching them from the said conductive system to be propagated within said guide.

26. The method of propagating electromagnetic waves over a common waveguide which comprises the steps of producing at least two electromagnetic waves of different intensity and different polarization, propagating one of said waves through said waveguide in one direction, propagating the other of said two waves through said waveguide in another direction, and changing the polarization of one of said propagated waves comprising rotating the polarization of said one of said waves but not of the other of said waves in response to the different intensities of said two waves.

27. The method of transmitting a signal which comprises producing plane, polarized, electrical waves, and directly rotating the polarization of said waves in response to the intensity of said waves above a predetermined level.

28. An arrangement for processing electromagnetic waves which comprises means for propagating electromagnetic waves, means normally inoperative for rotating the polarization of passing waves upon being rendered operative, said last named means responsive to the intensity of said propagated waves above a predetermined finite level passing said point to be rendered operative.

29. An arrangement for processing electromagnetic waves which comprises means for propagating electromagnetic waves, means located at a point for rotating the polarization of passing waves when rendered conductive above a given degree, said last named means responsive to the intensity of said propagated waves above a predetermined finite level passing said point to be rendered conductive above said degree.

30. The method of generating waves having lines of force of a certain orientation for propagation in a waveguide system which comprises generating and transmitting waves having lines of force of another orientation, receiving said transmitted waves as lines of force on a normally non-conductive system, rendering said normally non-conductive system conductive in response to the intensity of said received waves, guiding said lines of force along such conductive system so as to change them to said certain orientation, and detaching them from said conductive system to be propagated within said waveguide system with said certain orientation.

References Cited in the file of this patent

UNITED STATES PATENTS

| | | |
|---|---|---|
| 2,051,537 | Wolff et al. | Aug. 18, 1936 |
| 2,106,770 | Southworth et al. | Feb. 1, 1938 |
| 2,129,714 | Southworth | Sept. 13, 1938 |
| 2,364,371 | Katzin | Dec. 5, 1944 |
| 2,403,302 | Richmond | July 2, 1946 |
| 2,408,055 | Fiske | Sept. 24, 1946 |
| 2,416,168 | Fiske | Feb. 18, 1947 |
| 2,422,190 | Fiske | June 17, 1947 |
| 2,425,345 | Ring | Aug. 12, 1947 |
| 2,438,119 | Fox | Mar. 23, 1948 |
| 2,441,574 | Jaynes | May 18, 1948 |
| 2,519,795 | Smullin | Aug. 22, 1950 |
| 2,542,185 | Fox | Feb. 20, 1951 |
| 2,557,961 | Goldstein et al. | June 26, 1951 |
| 2,606,248 | Dicke | Aug. 5, 1952 |
| 2,607,849 | Purcell et al. | Aug. 19, 1952 |

FOREIGN PATENTS

| | | |
|---|---|---|
| 591,369 | Great Britain | Aug. 15, 1947 |